US008171045B2

(12) United States Patent
Adler

(10) Patent No.: US 8,171,045 B2
(45) Date of Patent: May 1, 2012

(54) RECORD BASED CODE STRUCTURE

(75) Inventor: Dustin Kurt Adler, Rancho Cordova, CA (US)

(73) Assignee: XSEVO Systems, Inc., Norco, CA (US)

( * ) Notice: Subject to any disclaimer, the term of this patent is extended or adjusted under 35 U.S.C. 154(b) by 705 days.

(21) Appl. No.: 12/183,823

(22) Filed: Jul. 31, 2008

(65) Prior Publication Data

US 2010/0030745 A1 Feb. 4, 2010

(51) Int. Cl.
*G06F 17/30* (2006.01)

(52) U.S. Cl. ........... 707/769; 707/758; 707/E17.014; 717/110; 717/114; 717/115; 717/118; 717/140; 717/145; 717/148

(58) Field of Classification Search ........... 717/110, 717/114, 115, 118, 132, 140, 145, 148; 707/758, 707/769, E17.014, 999.003, 999.101, 999.107
See application file for complete search history.

(56) References Cited

U.S. PATENT DOCUMENTS

| 3,411,139 | A | 11/1968 | Lynch et al. | |
|---|---|---|---|---|
| 5,361,351 | A | 11/1994 | Lenkov et al. | |
| 5,519,859 | A | 5/1996 | Grace | |
| 5,548,759 | A | 8/1996 | Lipe | |
| 5,586,329 | A | 12/1996 | Knudsen et al. | |
| 5,850,554 | A | 12/1998 | Carver | |
| 5,854,932 | A | 12/1998 | Mariani et al. | |
| 6,108,659 | A | 8/2000 | Vincent | |
| 6,182,281 | B1 * | 1/2001 | Nackman et al. ............. | 717/116 |
| 6,205,440 | B1 | 3/2001 | Nusbickel | |
| 6,279,151 | B1 | 8/2001 | Breslau et al. | |
| 6,629,313 | B1 | 9/2003 | Rowe et al. | |
| 7,024,663 | B2 | 4/2006 | Klein | |
| 7,047,249 | B1 | 5/2006 | Vincent | |
| 7,155,426 | B2 | 12/2006 | Al-Azzawe | |
| 7,174,544 | B2 * | 2/2007 | Zee ............................... | 717/148 |
| 7,735,598 | B2 | 6/2010 | Nakamura | |
| 7,971,194 | B1 * | 6/2011 | Gilboa .......................... | 717/136 |
| 2005/0187980 | A1 * | 8/2005 | Carlin et al. .................. | 707/200 |
| 2006/0085512 | A1 | 4/2006 | Handel et al. | |
| 2007/0038662 | A1 | 2/2007 | Bendel et al. | |
| 2007/0061798 | A1 * | 3/2007 | Atsatt .......................... | 717/166 |
| 2007/0240137 | A1 * | 10/2007 | Archambault et al. ....... | 717/140 |
| 2010/0030745 | A1 | 2/2010 | Adler | |
| 2010/0042585 | A1 | 2/2010 | Adler | |
| 2010/0070448 | A1 | 3/2010 | Omoigui | |
| 2010/0070516 | A1 | 3/2010 | Adler | |

OTHER PUBLICATIONS

International Search Report and Written Opinion, Jul. 30, 2009.
"Source Code in Database," Wikipedia, http://en.wikipedia.org/wiki/Source_Code_in_Database, Feb. 11, 2010.
Green, Roedy, Canadian Mind Products, "SCID," http://mindprod.com/project/scid.html, downloaded Mar. 4, 2011.
"Jade 6," http://www.jadeworld.com/jw/Technologies/High_Performance_Technology/JADE.php, downloaded Mar. 4, 2011.

(Continued)

*Primary Examiner* — Leslie Wong
(74) *Attorney, Agent, or Firm* — Peters Verney, LLP

(57) ABSTRACT

The compiled code of a computer program is stored in multiple pieces within a database. Each piece is optionally stored within a separate data record. Execution of the computer program includes using database queries to retrieve pieces of the compiled code for execution. The database and associated database management logic are used to provide numerous advantages in execution and management of the computer program. For example, in some embodiments, database queries are used to help facilitate program flow logic.

27 Claims, 5 Drawing Sheets

OTHER PUBLICATIONS

"What is Zope?" http://www.zope.org/WhatIsZope, downloaded Mar. 4, 2011.
Little, Jim, "Prism Criticism," http://lists.tunes.org/archives/tunes/1999-June/002143.html, Jun. 7, 1999.
Green, Roedy, Canadian Mind Products, "Aubjex: Java Glossary," http://mindprod.com/jgloss/aubjex.html, downloaded Mar. 4, 2011.
Fowler, Martin, "ProjectionalEditing," http://martinfowler.com/bliki/ProjectionalEditing.html, Jan. 14, 2008.
Fowler, Martin, "Language Workbenches: The Killer-App for Domain Specific Languages?" http://martinfowler.com/articles/languageWorkbench.html, Jun. 12, 2005.
Advertisement for "Model Driven Software Development," http://www.amazon.com/gp/product/0470025700, downloaded Apr. 6, 2011.
"Apache Sling," http://mvnrepository.com/artifact/org.apache.sling, 2006.
"Seaside Screenshots," http://www.seaside.st/about/screenshots?_k=qBQqx4pN, downloaded Mar. 4, 2011.
"Smalltalk Source Code Browser," http://stackoverflow.com/questions/1298020/how-useful-would-be-a-smalltalk-source-code-browser-for-other-programming-languag, Aug. 19, 2009.
Shariff, Fahd, "Source_Code_in_Database_SCID," http://www.scribd.com/doc/3010319/Source-Code-in-Database-SCID, May 2003.
"Kiln Features," http://www.fogcreek.com/kiln/features/source-code-control.html, 2000.
"SECO," http://www.kobrix.com/seco.jsp, downloaded Mar. 4, 2011.
Iordinov, Borislav, "Rapid Software Evolution," http://www.kobrix.com/documents/rse.pdf, Oct. 21, 2007.
"HyperGraphDB," http://www.hypergraphdb.org/index, downloaded Mar. 4, 2011.
"Source Code Control | Kiln from Fog Creek Software," http://www.springerlink.com/content/3m226811191wl566/, downloaded Mar. 28, 2011.
"Ruby that Scales," http://ruby.gemstone.com/, downloaded Mar. 4, 2011.
"Gemstone/s Object Server," http://www.gemstone.com/products/gemstone, 1983.
U.S. Appl. No. 12/191,711 non-final Office action, Mar. 16, 2011.
U.S. Appl. No. 12/210,629 non-final Office action, Dec. 3, 2010.
U.S. Appl. No. 12/210,629 Applicants' Response to non-final Office action, Mar. 2, 2011.
U.S. Appl. No. 12/191,711 final Office action, mailed Nov. 7, 2011.
U.S. Appl. No. 12/191,711 Appeal Brief, submitted Jan. 9, 2012.

* cited by examiner

RECORD BASED CODE STRUCTURE

BACKGROUND

1. Field of the Invention

The invention is in the field of computing systems, and more specifically in the fields of computer programming and provisioning.

2. Related Art

In a typical computing model source code is generated by a programmer using an editor. This source code may be configured to be interpreted at the time it is executed or compiled into executable code using a compiler. Compiled code typically executes more quickly than interpreted code because the compiling process includes parsing and syntax checking prior to execution. Compiling the code also places the code in a form (e.g., object code) that may be directly executable using an operating system.

The compiled code is stored using a filing system, typically provided with an operating system configured to execute the compiled code. For example, the compiled code may be stored in an ".exe" file for execution within the Windows operating system. The compiled code may be linked to other files containing executable code, data or scripts. This linking may occur prior to or at the time the code is executed. When the code is executed the file system is used to identify the file within which the code is stored and this file is opened and processed by the operating system.

There are several disadvantages to this computing model. For example, modification of the compiled code typically involves recompiling an entire source code or file thereof. If a single function, among many functions, within source code, is modified, then the entire source code, on a file-by-file basis, is recompiled. Further, specific permissions and specific software (e.g., an editor) are required to modify the source code. This can be cumbersome when the editor and code are on different computing devices.

Databases and database programs configured to manage the databases are commonly used to store and access data. Sometimes this data is used by computer programs external to database programs. For example, an external program may use a database program to retrieve data that is then operated on by the external program. Database programs may also include "database stored procedures" which are functions prepared by a user of the database program to operate on a database. Database stored procedures are limited to operating on stored data and are differentiated from other types of computer programs in that these procedures are run under the control of (e.g., within) the database program rather than under direct control of an external operating system.

SUMMARY

Various embodiments of the invention comprise a computing architecture in which executable code, for execution external to a database program, is stored within records of a database. The executable code is retrieved from the database at the time of execution. This executable code typically includes compiled code that is ready for execution on an operating system. In comparison to the prior art, the executable code is managed and accessed via the database program rather than merely via a file system.

Storage of executable code within the records of a database provides a variety of advantages, some of which are provided as examples herein. For example, the code may be easier to manage in a database than a file system. The executable code can be stored with a greater degree of granularity than would normally be practical using a file system. In some embodiments, executable code is stored at a granularity such that individual functions are located in different data records of the database. In some cases this allows for the executable code to be managed, modified or otherwise manipulated at the function level rather than at the file level.

During execution of a computer program, database queries are used to retrieve the stored code from the database. The retrieved code is then executed external to the database and supported by the operating system. The code may be executed one part at a time, each part being separately retrieved from the database. Queries are optionally used to facilitate conditional program flow. For example, a CASE statement that uses a label to direct program flow between a number of alternative paths may be implemented by a database query that uses the label as a query parameter.

Various embodiments of the invention include a system comprising: a computing device; operating system logic configured to run on the computing device and stored on a computer readable media of the computing device; a database stored on a computer readable media and including data records configured to store compiled code of a computer program; database management logic configured for accessing the database; and code execution logic configured to retrieve the compiled code from the data records by executing one or more queries on the database management logic, and to execute the retrieved code on the operating system logic.

Various embodiments of the invention include a method comprising: receiving a request to execute a computer program; executing a first query to identify a first database record, of a database, in which a subset of compiled code of the computer program is stored. retrieving first code from the identified first database record as a result of the first query; providing the retrieved first code to an operating system for execution; generating a second query based on a result of the execution of the retrieved first code; using the generated second query to identify a second database record, of the database, in which compiled code of the computer program is stored; retrieving the compiled code from the second database record as a result of the second query; and providing the retrieved compiled code to the operating system for execution.

Various embodiments of the invention include a method comprising: receiving source code of a computer program, the source code comprising a plurality of functions; compiling the plurality of functions, the compiled functions being configured for execution on an operating system; storing each of the compiled plurality of functions in a separate database record; and indexing each of the separate database records using an identifier of the function stored in the database record, the identifiers being configured to select members of the plurality of functions according to program flow logic.

DETAILED DESCRIPTION

In various embodiments, the invention includes a computing device on which a computer program is stored within a database, systems and methods of storing and modifying the computer program, systems and methods of executing the computer program, and other features discussed herein. The stored computer program includes compiled code as well as optionally data, scripts, mark-up language, images, source code, or the like. The computer program is optionally stored at a granularity wherein individual functions are store in separate data records. The computer program is executed by retrieving the stored compiled code from the database at the time of execution. In some instances the computer program is part of an internet based application configured to be accessed, modified and/or executed though a browser.

The compiled code is object code or byte code that has been parsed and converted from a human-readable source code form so as to be more efficiently executed by a software interpreter. Byte code may be executed by a virtual machine (e.g., interpreter) or it may be further compiled to machine code. Using byte code a computer program may be executed in two phases, first compiling source code into byte code, and then passing the byte code to a virtual machine. Such virtual machines are portable and exist for popular programming languages such as C, Java, Python, PHP (Hypertext Preprocessor), Forth and Tcl (Tool Command Language). Other examples of byte code include code of the BCPL programming language, p-code of UCSD Pascal, Scheme 48, CLISP, CMUCL, Microsoft .NET Common Intermediate Language, among others. Object code is a representation of source code that has been generated by a compiler or assembler. This code may include binary instructions (machine code), data for use by the code, program symbols, relocation information, debugging information, and/or the like. The compiling of object code or byte code typically includes performing syntax checks on source code and parsing the source code at least one time to generate the object or byte code.

Figure 1:
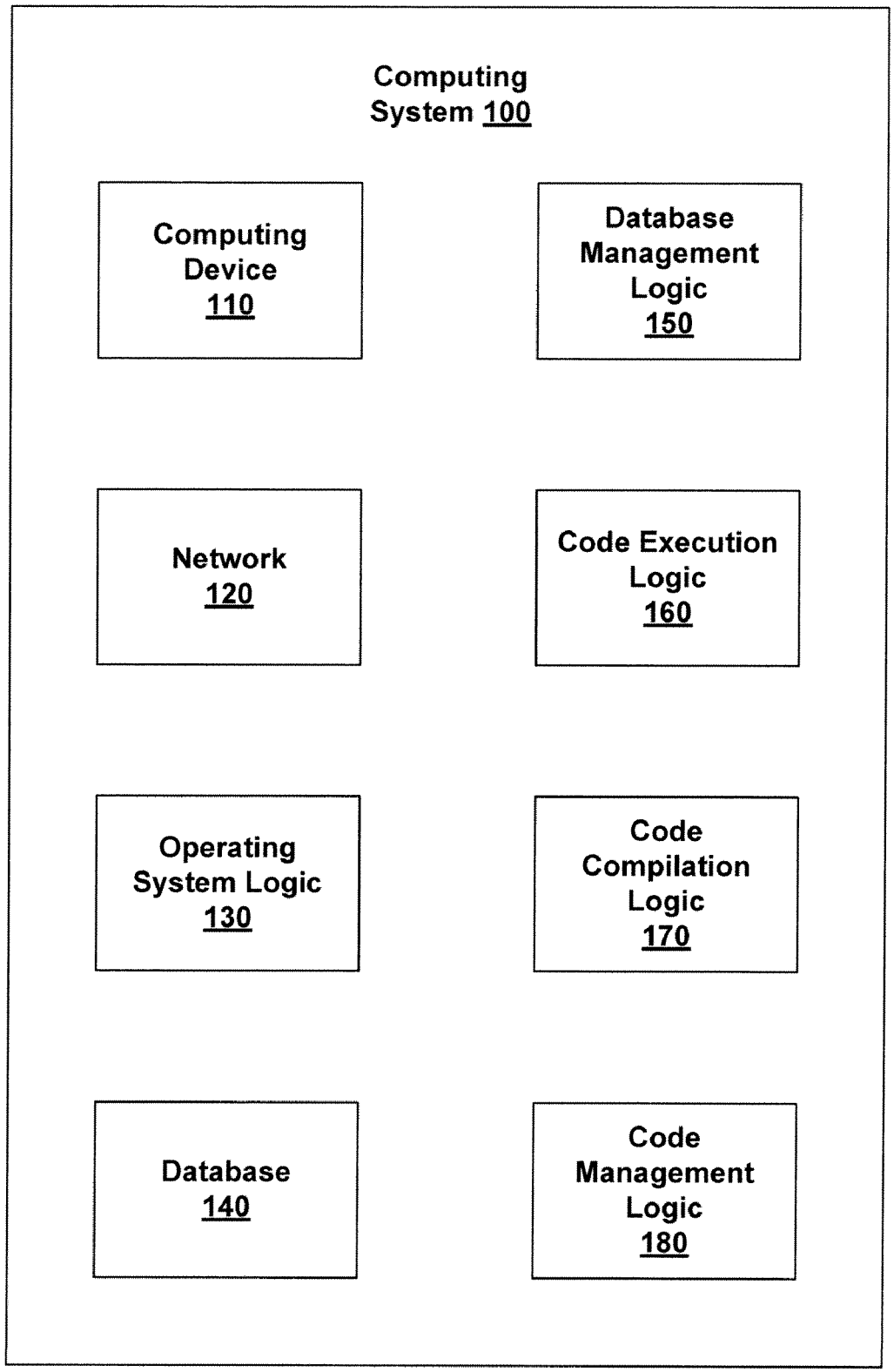
FIG. 1 illustrates a computing system, according to various embodiments of the invention.

FIG. 1 illustrates a Computing System 100, according to various embodiments of the invention. Computing System 100 is configured for the preparation, storage and/or execution of computer programs. As is further described herein, Computing System 100 is optionally a distributed system comprising a plurality of discrete devices configured to communicate together. Computing System 100 comprises at least one Computing Device 110. Computing Device 110 includes hardware such as a processor, memory and input/output configured to execute a computer program. In various embodiments Computing Device 110 comprises a server, a personal computer (PC), a workstation, a portable computing device, or the like.

Computing Device 110 is optionally connected to other computing devices via a Network 120. Network 120 may include the internet, a wide area network, a local area network, or the like. For example, in some embodiments Computing Device 110 includes a server configured to execute a computer program, the output of which is communicated over the internet and presented to a user within a browser. Network 120 may also be configured to facilitate communication between various distributed elements of Computing System 100.

Computing System 100 further comprises Operating System Logic 130. Operating System Logic 130 is optionally stored on a computer readable media within Computing Device 110 and is configured to run on Computing Device 110 so as to support the execution of object code or byte code on Computing Device 110. Operating System Logic 130 is optionally further configured to support a file system on Computing Device 110. Operating System Logic 130 may include, for example, LINUX, UNIX, BSD Unix, Mac OS X, HPUX, Solaris, Microsoft Windows, or the like.

Computing System 100 further comprises a Database 140. Database 140 is typically a relational database stored on computer readable media and may be stored on Computing Device 110 or on some other computing device within Computing System 100. Database 140 comprises data records configured to store compiled code of a computer program. Data records within Database 140 are optionally also configured to store data on which the computer will operate, configuration data related to the computer program, non-compiled computing instructions, and/or the like. For example, non-compiled computing instructions stored in data records of Database 140 may include scripts, mark-up language instructions, source code, code configured to be interpreted in a text format, or the like. Compiled and non-compiled computing instructions may be stored in the same and/or different data records. In some embodiments, Computing System 100 comprises an instance of Database 140 configured to store compiled code and a similar database configured to store related source code. The logical division of compiled code among different data records may be similar to the division of source code among database records. Further details of Database 140 are described elsewhere herein, for example with respect to FIG. 2.

Database 140 is typically managed by Database Management Logic 150 installed on the same computing device as Database 140. Database Management Logic 150 is configured to access (e.g., read or write) records within Database 140 using queries. Database Management Logic 150 may also be configured to control access to Database 140, to define tables of data records within Database 140, to log operations on Database 140, and/or to perform other functions commonly available from database management tools. Database 140 optionally is configured to store compiled code of more than one computer program.

Computing System 100 further includes Code Execution Logic 160. Code Execution Logic 160 is configured to retrieve the compiled code from the data records by executing one or more queries through Database Management Logic 150, and to execute the retrieved code using Operating System Logic 130. Code Execution Logic 160 may be stored on Computing Device 110 or on some other computing device within Computing System 100.

More specifically, Code Execution Logic 160 is configured to formulate queries that are configured to retrieve a next required stored piece of compiled code. For example, when a computer program is first executed, Code Execution Logic 160 may be used to formulate a query configured to identify a data record within Database 140 that includes code of an entry point of the computer program. This query may include an identifier of the program as well as a parameter indicating that the entry point is required. The results of this query comprise the entry point code which is then passed to Operating System Logic 130 for execution. Code Execution Logic 160 is then used to formulate a second query configured to retrieve the next code to be retrieved from Database 140 for execution on Operating System Logic 130. The second query may be formulated after the first query is formulated and/or may be formulated after the first code is executed.

The second query may be formulated shortly after the first query if the program flow following the code retrieved by the first query is known. The program flow is the order in which code will be executed. Program flow may be varied using, for example, conditional branching statements within the computer program. These conditional branching statements include, for example, IF statements, WHILE statements, CASE statements, or the like. If the computer program includes a conditional branching statement, the contents of the second query may be dependent on results of executing the code retrieved using the first query. In some embodiments, therefore, it may not be possible to formulate the second query until after the code of the first query is finished executing.

Sometimes conditional branching statements include a label to which program flow should jump. In systems of the prior art, this label may be converted to a pointer. In some embodiments, the label is used as a parameter in the second query. Within the query, this label is used by Data Management Logic 150 to identify the data record in which the next code to be executed is stored. As a result of this feature, the querying capabilities of Database Management Logic 150 may be used to control program flow within the executed program. This may result in several advantages. For example, a new option (program flow destination) may be added to a conditional branching statement by adding an appropriate data record to Database 140 and indexing the added data record using a label to be included in a query by Code Execution Logic 160. In various embodiments, parameters included in queries are received by Code Execution Logic 160 from a user, from a command line, from a configuration file, from an examination of available hardware, retrieved from a database, web request data, and/or another computer program.

Code Execution Logic 160 may be configured to formulate and execute further queries, following the second query, having similar characteristics. This process may be repeated until program termination.

Computing System 100 optionally further includes Code Compilation Logic 170 configured to generate the compiled code from source code. Code Compilation Logic 170 is optionally a standard compiler configured for compiling source code to byte or object code. Code Compilation Logic 170 is alternatively a customized compiler configured to compile source code to byte or object code, and to output the source code in a piecemeal form including pieces of compiled code that are of appropriate scope for storage in Database 140. For example, Compilation Logic 170 may divide the compiled code into parts at the function (procedure) level, a functional level, by class definition, or into other logical elements. In some embodiments, the compiled code is divided into parts based on program flow within the computer program. In these embodiments, the compiled code may be divided at points where jumps to labels within the code are made. In some embodiments, Code Compilation Logic 170 is configured to automatically compile received source code and then store the compiled code in Database 140. Code Compilation Logic 170 may be stored in Computing Device 110 or some other computing device of Computing System 100. In some embodiments, Code Completion Logic 170 is configured to store definition code for a class in a data record, or alternatively store each class method of a class in a separate data record.

Computing System 100 optionally further includes Code Management Logic 180 configured for modifying and otherwise manipulating the compiled code. In some embodiments Code Management Logic 180 is configured for a user to access source code, retrieve the accessed source code, edit the source code, compile the source code using Code Compilation Logic 170, and/or store the compiled source code in Database 140. Code Management Logic 180 typically uses Database Management Logic 150 for accessing, retrieving, and storing compiled code in Database 140. Database Management Logic 150 optionally further uses Database Management Logic 150 (or an instance thereof) to access source code stored in Database 140 or another database.

Code Management Logic 180 is optionally configured for use within a web browser. For example, Code Management Logic 180 may be configured to communicate with Database Management Logic 150 and/or Code Compilation Logic 170 via the internet. In some embodiments, Code Management Logic 180 is configured to access both compiled code and source code using one or more instances of Database Management Logic 150. For example, if the source code is stored in a database, Code Management Logic 180 may use queries to access this source code. The source code may be stored in a single record or stored in multiple records in a piecemeal fashion. In embodiments wherein the source code is stored in multiple records, Code Management Logic 180 is optionally configured to either present one piece of source code to a user at a time or several pieces of source code to a user at the same time. When several pieces of source code are presented to the user at the same time, the results of queries to the database including the source code may be appended together such that the source code is presented as a continuous body of human-readable text. Code Management Logic 180 is optionally configured to present the source code to a user within an editing environment so that the source code can be modified by the user.

If the source code is edited, Code Management Logic 180 is configured to store the edited source code. This storage may be in a file or in a database. Code Management Logic 180 is further configured to compile the edited source code and store the compiled source code in Database 140. The source code may be compiled in its entirety or in a piecemeal fashion. For example, if only one piece of source code was retrieved from a database and edited, then only this piece of source code may be recompiled and stored, in the compiled form, in Database 140.

Figure 2:
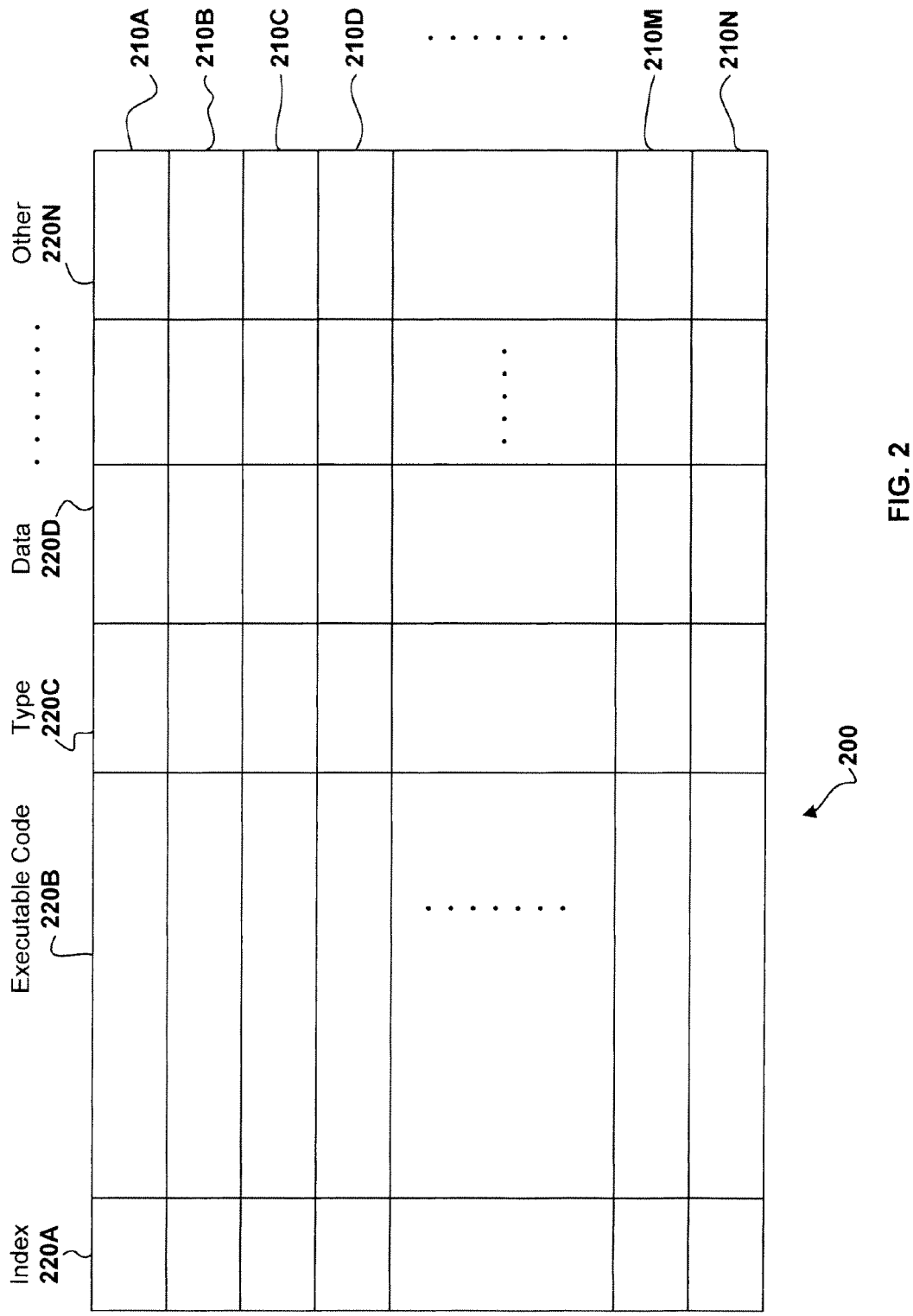
FIG. 2 illustrates a data structure, according to various embodiments of the invention.

FIG. 2 illustrates a Data Structure 200 as may be included in Database 140, according to various embodiments of the invention. Data Structure 200 comprises a plurality of Records 210, individually labeled 210A, 210B, ... 210N. Data Structure 200 may include any number of Records 210. Each of Records 210 comprises a plurality of Data Fields 220, individually labeled 220A, 220B, ... 220N. Each of Records 210 may include more or fewer Fields 220 than illustrated in FIG. 2. These Fields 220 are accessible, readable and writable using queries executed by Database Management Logic 150. Typically, several instances of Data Structure 200 are included in Database 140. Each of Data Structure 200 is optionally stored in a different file. The order of Data Fields 220 illustrated in FIG. 2 may be varied in alternative embodiments.

In an exemplary embodiment, a Field 220A is configured to store a record index value. The index value is typically a unique identifier configured to identify a particular data record. The index value is optionally used as a label to control program flow. A Field 220B is configured to store a piece of executable code or source code of a computer program. As discussed elsewhere herein, this code may be stored on a line-by-line basis, on a function basis, on a functional basis, on a basis based on program flow, or some other basis for dividing the computer program into separate pieces.

An optional Field 220C is configured to store a data or function type. This type may be the type of a value (or object) expected by the code stored in Field 220B, or the type of a value (or object) returned by the code stored in Field 220B.

An optional Field 220D is configured to store data on which the code stored in Field 220B is configured to operate on. For example, Data Field 220D may include constants for use by the stored code.

Records 210 may include a wide variety of additional fields, represented in FIG. 2 by Field 220N. One or more Fields 220N may include fields configured to store: further labels configured to control program flow, a label (or index vale) of a subsequent piece of code, a version identifier of the code stored in Field 22B, configuration information, mapping information, scheduling information, a human readable description or explanation of the code, organization information for an editor, or the like.

Database 140 is typically stored in one or more tables each including an instance of Data Structure 200. These tables are optionally combined using a JOIN instruction or the like. For example, in some embodiments code is store in a first database table that includes function types, function names, function parameters and default data, a second table that includes source code for each instance of a function, and a third table that includes compiled byte code (or the like) of each function instance.

Figure 3:
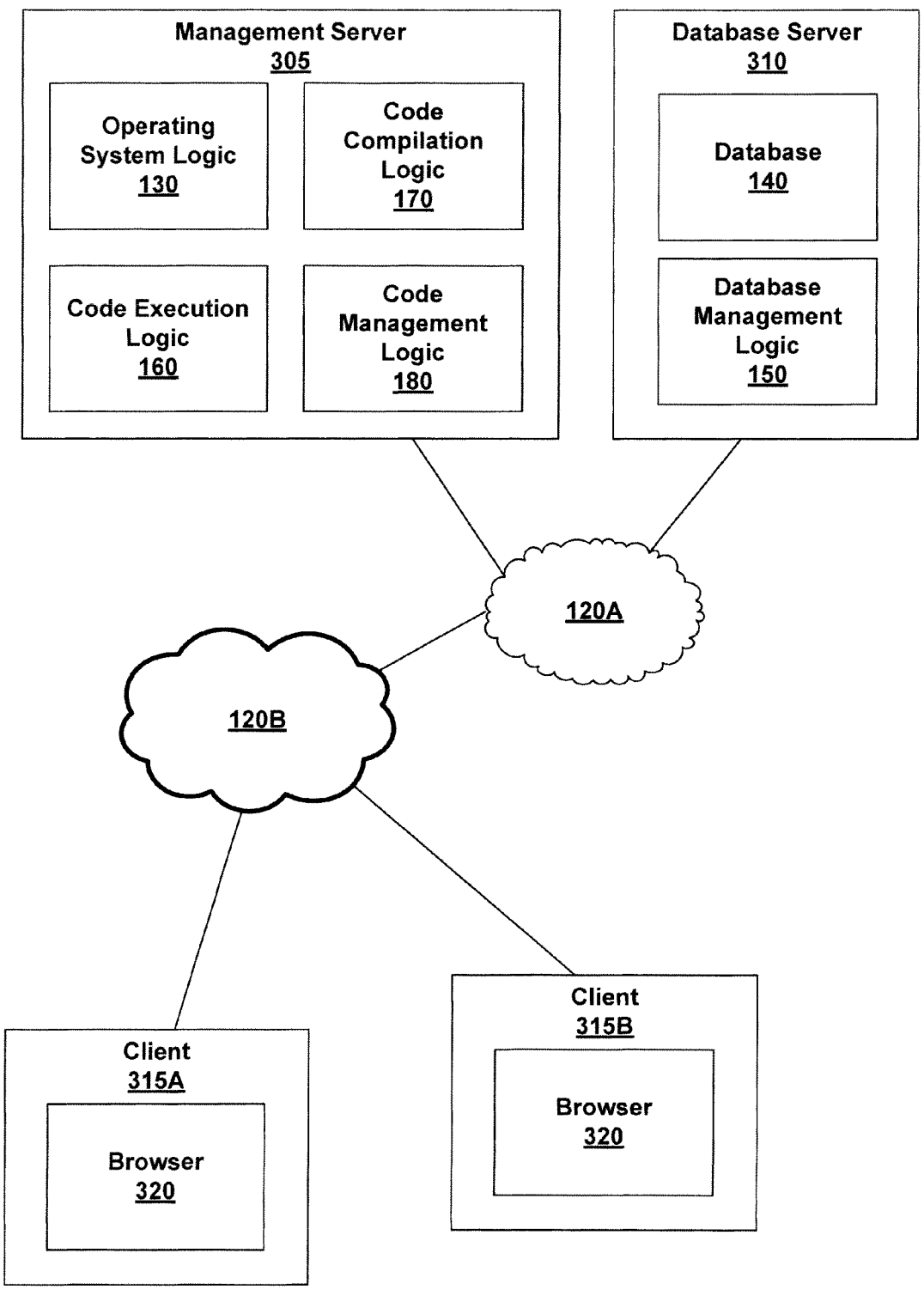
FIG. 3 illustrates a distributed computing system, according to various embodiments of the invention.

FIG. 3 illustrates distributed embodiments of Computing System 100. In these embodiments Computing System 100 is divided into, for example, a Management Server 305 and a Database Server 310. Management Server 305 includes Operating System Logic 130, Code Execution Logic 160, and optionally Code Compilation Logic 170 and Code Management Logic 180. Database Server 310 includes Database 140 and Database Management Logic 150. Management Server 305 and Database Server 310 are configured to communicate with each other through part of Network 120, for example a Local Area Network 120A. Management Server 305 is optionally configured to communicate with more than one instance of Database server 310. Each of these instances may be configured to support one or more different computer programs.

Management Server 305 is further configured to communicate with one or more Clients 315, referred to herein as Client 315A, Client 315B, Client 315C, etc. This communication may be through another part of Network 120, for example Internet 120B. In some embodiments, Management Server 305 is configured to be accessed by users of clients via an internet Browser 320, e.g., Internet Explorer or Firefox. This access may include execution of computer programs stored in Database 140 and/or development and modification of these computer programs.

Figure 4:
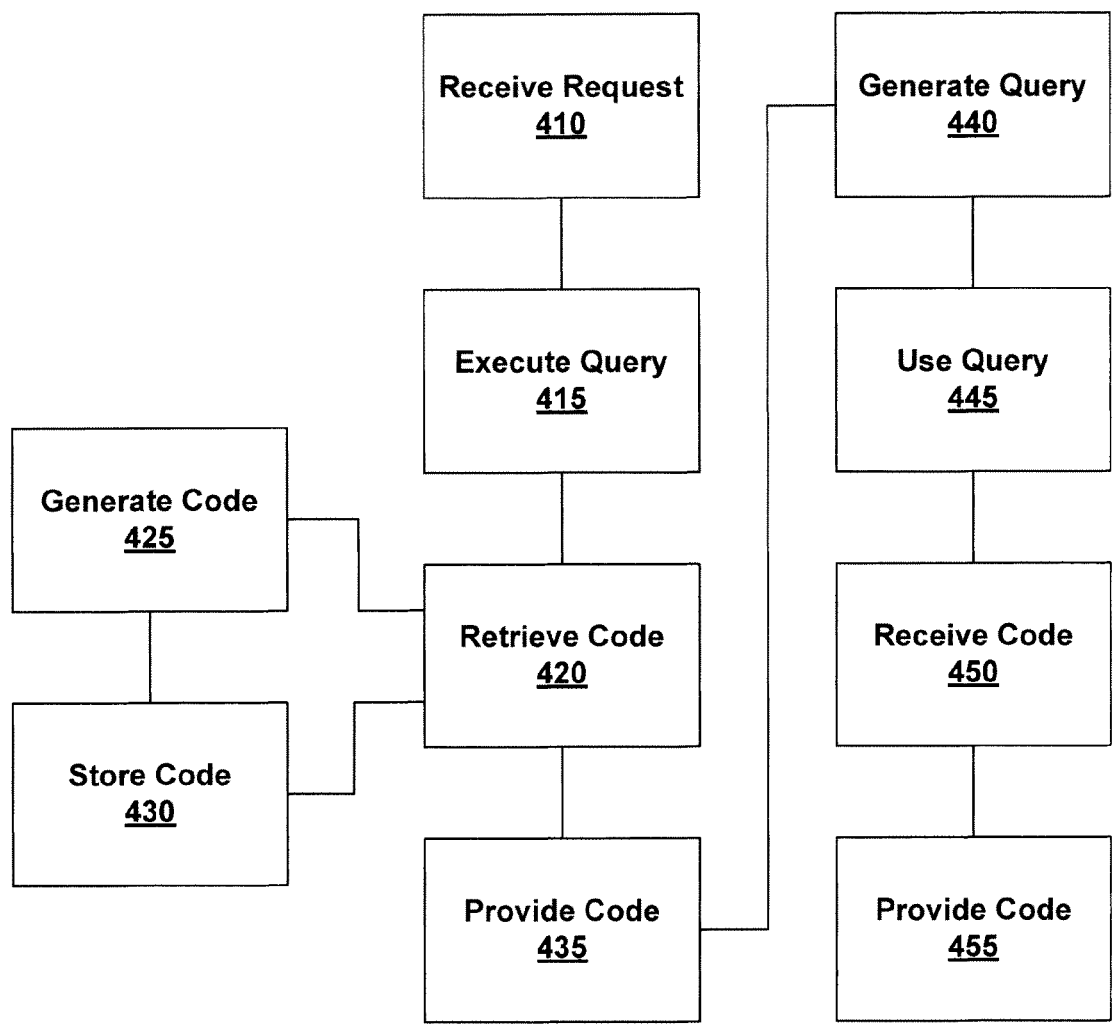
FIG. 4 illustrates methods of executing a computer program, according to various embodiments of the invention.

FIG. 4 illustrates methods of executing a computer program, according to various embodiments of the invention. As described elsewhere herein, the computer program is executed by retrieving executable code from a database, and executing this retrieved code on an operating system external to the database. These methods may be performed using Computing System 100, optionally in response to communications received from Clients 315. The steps illustrated in FIG. 4 may be performed in alternative orders.

In a Receive Request Step 410 a request to execute a computer program is received by Computing System 100. This request may be received from another computing device, from a user of Management Server 305 or from a user of one of Clients 315. In some embodiments the request is received via Browser 320, includes a universal resource locator (URL), and/or is communicated via HTTP, is communicated via TCP/IP, and/or is provided using a POST operation. In addition to information identifying the computer program, the request optionally includes other data such as security information, configuration data, version information, uploaded file data, an image, video, or the like.

In an Execute Query Step 415 a query is provided to Database Management Logic 150. This query is configured to retrieve a subset of the compiled code of the computer program from one of Records 210 within Database 140. The query may be a predetermined query or may be configured in response to data received as part of the request.

In a Retrieve Code Step 420 the execution of the query executed in Execute Query Step 415 results in the retrieval of a first piece of code from Database 140. This first piece of code is a subset of the code of the computer program. As discussed elsewhere herein, the retrieved code may be a single function, a single functional unit, a block of code between conditional branches in a program flow, a single line of code, or other division of the total code of the computer program.

If the retrieval of code in Retrieve Code Step 420 fails, e.g., if the code is not available, then in an optional Generate Code Step 425 the compiled code is generated from source code using Code Compilation Logic 170. This generated code is then stored in one of Records 210 of Database 140. Generate Code Step 425 may include all or a subset of the total code of the computer program. If all of the code is generated, then different parts of the generated code are stored in different Records 210.

In an optional Store Compiled Code Step 430 any code generated in Generate Code Step 425 is stored in one or more Records 210 of Database 140 using Database Management Logic 150. Retrieve Code Step 420 is then attempted again. This storage may occur in an original copy of Database 140 or a cached copy of Database 140. A cached copy is optionally created by Code Execution Logic 160 or other elements of Computing System 100.

In a Provide Code Step 435, the executable code retrieved in Retrieve Code Step 420 is provided to Operating System Logic 130 for execution. This execution typically is not dependent of Database Management Logic 150. For example, as illustrated in FIG. 3, Operating System Logic 130 and Database Management Logic 150 are optionally included on different computing devices. The code is, thus, optionally executed on Operating System Logic 130 remote from Database Management Logic 150.

In a Generate Query Step 440, a second query is generated. This query is configured to retrieve further code of the computer program from Database 140. The second query is optionally based on a result of the execution of the retrieved first code. For example, the execution of the retrieved first code may generate a value that determines program flow, e.g., the object of a subsequent IF or CASE statement. This value may then be included in the second query as a parameter.

In a Use Query Step 445, the generated second query is used to identify a second of Records 210 of Database 140. This second of Records 210 may include compiled code of the computer program, other executable code, non-compiled code, data, scripts, mark-up language, images, source code, and/or the like.

In a Receive Code Step 450, executable code is received from the second database record as a result of the second query. This code is received by a computing device including Operating System Logic 130, for example Management Server 305. The executable code is optionally received via Network 120.

In a Provide Code Step 455, the executable code received in Receive Code Step 445 is provided to Operating System Logic 130 for execution. This execution is optionally independent of Database Management Logic 150, although the execution may generate a result that is later used to access Database 140 using Database Management Logic 150. As such, the Steps Generate Query 440 through Provide Code 455 may be repeated to retrieve and execute multiple pieces of code from Database 140. This process may continue until the computer program is terminated.

Figure 5:
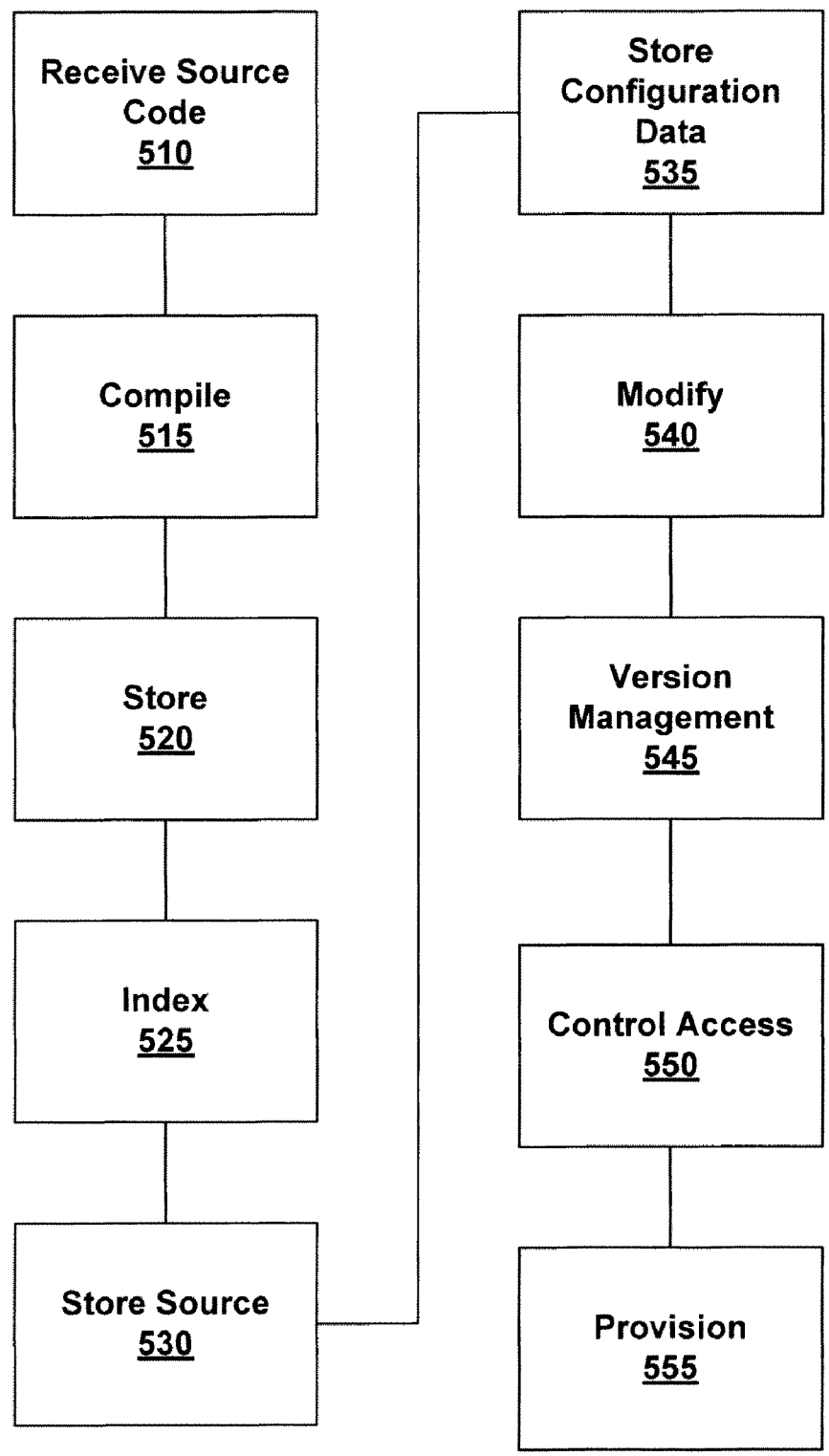
FIG. 5 illustrates methods of creating and modifying a computer program, according to various embodiments of the invention.

FIG. 5 illustrates methods of creating and modifying a computer program, according to various embodiments of the invention. In these methods source code is received and compiled. The compiled code is stored in an indexed manner in multiple pieces within Records 210. The method optionally includes further steps in which the source code or other data are stored, the stored compiled code is modified, the Database Management Logic 150 is used to provide additional features, and/or the database computer program is provisioned by supplying a copy of Database 140. The steps illustrated in FIG. 5 may be performed in alternative orders.

In a Receive Source Code Step 510, the source code of a computer program is received by Computing System 100. The computer program may be received from a storage device, from another computing device via Network 120, or from a user entering text. The received source code typically includes a plurality of functions.

In a Compile Step 515, the source code received in Receive source Code Step 510 is compiled using Code Compilation Logic 170. This step may include generating a single block of compiled code or generating multiple pieces of compiled code divided as discussed elsewhere herein. For example, Code Compilation logic 170 may be used to divide the compiled code into pieces that can be separately stored in Records 210 of Database 140. For example, in some embodiments, Code Compilation logic 170 is used to produce separate pieces of compiled code based on functions or program flow of the source code. The compiled code generated in Compile Step 515 is configured for execution on Operating System Logic 130 and is typically in byte code, object code, machine code, and/or the like.

In a Store Step 520, the compiled code generated in Compile Step 515 is stored in Records 210 of Database 140. Each piece of the compiled code is optionally stored in a separate member of Records 210. If the code was generated in multiple pieces in Compile Step 515 then these pieces can typically be stored directly. However, if Compile Step 515 results in a single block of compiled code, then Store Step 520 includes dividing this block into separate pieces. This division may be performed using Code Management Logic 180 and typically includes dividing the code up on one or more of the basis discussed elsewhere herein.

Store Step 520 optionally includes storing further information, in addition to compiled code. For example. Store Step 520 may include storing other executable code, configuration code, data to be operated on by the code, type information, or any of the other information discussed herein.

In an Index Step 525, the members of Records 210 in which compiled code are stored are indexed. The indexing process is typically performed using Code Management Logic 180 and/or Database Management Logic 150. The indexing is configured for the identification and retrieval of the stored compiled code and optionally other information. Each separately stored piece of code is typically associated with a unique index or set of indexes. Thus, each piece of code may be identified using the indexing. In some embodiments, Index Step 525 includes adding labels (or other identifiers) meaningful to program flow to Records 210. For example, a label added in Index Step 525 may identify a piece of code as a program flow destination following a conditional statement.

In an optional Store Source Step 530, the source code received in Receive Source Code Step 510 is stored. The source code is optionally stored in pieces with the compiled code in Database 140, or in pieces in a separate database having a structure similar to that of Database 140, e.g., where Field 220 is used to store source code rather than compiled code. Alternatively, Store Source Step 530 may include storing the source code in a conventional text file.

In an optional Store Configuration Data Step 535, configuration data is stored in Database 140. This configuration data is configured for providing a user with alternative configurations of the computer program represented by the received source code. For example, in some embodiments, more than one set of configuration data is stored in Database 140, each set in a different data record. A query executed using Database Management Logic 150 may then be used to retrieve a configuration desired by a user or appropriate for a specific hardware target, or the like.

In an optional Modify Step 540, compiled code within Records 210 is modified. This modification process may include altering the stored source code or receiving new source code, compiling the altered or new source code, and replacing compiled code stored in one or more of Records 210 with the new compiled source code. Modify Step 540 may be performed using Code Management Logic 180 to modify the source code, Code Compilation Logic 170 to compile the source code, and Database Management Logic 150 to store the new compiled code in one or more of Records 210.

Modify Step 540 is optionally performed on one piece of the compiled code at a time. For example, the modification may be made to compiled code stored in only one or a subset of Records 210. Other compiled code, of the same computer program, need not necessarily be recompiled. As such, the modification and recompiling may be limited to a single piece of code separated from other code on the basis of function, functionality, program flow, or the like. In some embodiments Code Compilation Logic 170 is configured to operate in a production mode and a development mode. A greater amount of the compiled code is recompiled in the production mode relative to the development mode, after modification of the code.

In an optional Version Management Step 545, version control of the stored compiled code, and other parts of the computer program are performed using logging capabilities of Database Management Logic 150. For example, in some embodiments, Database Management Logic 150 includes a logging feature configured to log changes in Database 140. This feature may be used to track changes in the computer program. Likewise, Database Management Logic 150 may have a rollback feature configured to return the database to a previous state. This feature may be used to restore previous versions of code. In some embodiments, Database Management Logic 150 is configured to keep multiple copies of Database 140 or individual Records 210 and to track these copies using version information.

In an optional Control Access Step 550, access control features of Database Management Logic 150 are used to control access to the computer program or features thereof. For example, Database Management Logic 150 may be configured to control access to particular Records 210 or sets thereof within Database 140 (or control access to Database 140 in its entirety). This access control can be used to prevent a user from accessing pieces of compiled code associated with specific functionality, specific data, images, or any other aspect of the computer program.

In an optional Provision Step 555, the computer program is provisioned to a computing device by providing a copy of Database 140 to that computing device. This provisioning may occur over Network 120. The step takes advantage of the fact that, in some embodiments, Database 140 is portable.

Several embodiments are specifically illustrated and/or described herein. However, it will be appreciated that modifications and variations are covered by the above teachings and within the scope of the appended claims without departing from the spirit and intended scope thereof. For example, the various logic discussed herein may comprise hardware, firmware and/or software stored on a computer readable media. Different parts of a computer program are optionally stored within different tables of Database 140. For example, where a computer program comprises multiple source files and/or object files, each of these may be stored in a separate table. The compiled code discussed herein is optionally configured for execution within a browser. The various embodiments discussed herein may be applied to web or non-web applications. The compiled code discussed here may be executed on a virtual machine. Likewise, various components of Computing System 100 may include virtual machines.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
a computing device;
operating system logic configured to run on the computing device and stored on a non-transitory computer readable media of the computing device;
a database stored on a non-transitory computer readable media and including data records configured to store compiled code of a computer program;
code management logic configured for modifying the compiled code and further configured to provision an application to the computing device by sending the database to the computing device via a network;
database management logic configured for accessing the database; and
code execution logic configured to retrieve the compiled code from the data records by executing one or more queries on the database management logic, and to execute the retrieved code on the operating system logic.

2. The system of claim 1, wherein at least part of the compiled code is stored as a function.

3. The system of claim 1, wherein at least part of the compiled code is configured to control a device external to the database.

4. The system of claim 1, wherein the compiled code includes compiled python code, compiled Microsoft .NET Common Intermediate Language code, Perl, PHP, Ruby, or compiled Java code.

5. The system of claim 1, wherein the database further includes data records configured to store non-compiled code.

6. The system of claim 1, wherein the database further includes data records configured to store source code of the compiled code.

7. The system of claim 1, wherein the database further includes data records configured to store hypertext markup language, a script, or extended markup language.

8. The system of claim 1, wherein the code execution logic is further configured to execute a computer program by making a plurality of queries on the database and to execute a plurality of compiled code returned as a result of these queries.

9. The system of claim 8, wherein a program flow of the computer program is dependent on the queries.

10. The system of claim 1, wherein the code execution logic is further configured to determine the queries, the queries being based on conditional program flow logic.

11. The system of claim 1, wherein the code management logic is configured to be accessed via a browser.

12. The system of claim 1, wherein the code management logic is configured to edit source code within the database at a level of individual records.

13. The system of claim 1, wherein the code management logic is configured to edit and recompile the code on a record-by-record basis.

14. The system of claim 1, wherein the code management logic is remote from the computing device.

15. The system of claim 1, further comprising code compilation logic configured to generate the compiled code from source code.

16. The system of claim 15, wherein the code execution logic is further configured to execute a database query to determine if part of the compiled code is available in the database, and to use the code compilation logic to generate the part of the compiled code if the part of the compiled code is not available in the database.

17. The system of claim 16, wherein the code execution logic is further configured to cache a copy of the generated part of the compiled code in the database.

18. A system comprising:
a computing device;
operating system logic configured to run on the computing device and stored on a non-transitory computer readable media of the computing device;
a database stored on a non-transitory computer readable media and including data records configured to store compiled code of a computer program;
code compilation logic configured to operate alternatively in a production mode and a development mode, a greater amount of the compiled code being recompiled in the production mode relative to the development mode after modification of the code;
database management logic configured for accessing the database; and
code execution logic configured to retrieve the compiled code from the data records by executing one or more queries on the database management logic, and to execute the retrieved code on the operating system logic.

19. The system of claim 18, wherein the code compilation logic is configured to automatically compile code prior to storage in the database.

20. A system comprising:
a computing device;
operating system logic configured to run on the computing device and stored on a non-transitory computer readable media of the computing device;
a database stored on a non-transitory computer readable media and including data records configured to store compiled code of a computer program;

code management logic configured for modifying the compiled code and further configured to index the data records based on program flow logic in source code;

database management logic configured for accessing the database; and code execution logic configured to retrieve the compiled code from the data records by executing one or more queries on the database management logic, and to execute the retrieved code on the operating system logic.

21. A method comprising:

receiving, from a computing device, a request to execute a computer program;

executing a first query to identify a first database record, of a database, in which a subset of a compiled code of the computer program is stored;

modifying the compiled code and adding the modified compiled code to the database;

provisioning an application to the computing device by sending the database to the computing device via a network;

retrieving first code from the identified first database record as a result of the first query;

providing the retrieved first code to an operating system for execution;

generating a second query based on a result of the execution of the retrieved first code;

using the generated second query to identify a second database record, of the database, in which compiled code of the computer program is stored;

retrieving the compiled code from the second database record as a result of the second query; and providing the retrieved compiled code to the operating system for execution.

22. The method of claim 21, wherein the request is received over a computing network.

23. The method of claim 21, wherein the second query is based on conditional program flow logic of the computer program.

24. The method of claim 21, wherein the compiled code in the second database record consists of a compiled function.

25. The method of claim 21, further comprising determining that a part of the compiled code is not available in the database, generating the unavailable part of the compiled code, and storing the generated part in the database.

26. The method of claim 21 wherein source code is stored in the database.

27. A system comprising:

a first computing device;

operating system logic configured to run on the first computing device and stored on a non-transitory computer readable media of the first computing device;

a database stored on a non-transitory computer readable media of a second computing device and including data records configured to store source code of a computer program;

database management logic configured for accessing the database;

code compilation logic configured to run on the first computing device and to retrieve the source code from the data records by executing one or more queries on the database management logic, and to compile the retrieved source code on the operating system logic; and code management logic configured for modifying the compiled code and further configured to provision an application to the first computing device by sending the database to the first computing device via a network.

* * * * *